Dec. 7, 1937.    F. NALLINGER    2,101,627
MOTOR VEHICLE WITH COMPRESSED AIR COOLING
Filed Nov. 16, 1935    2 Sheets-Sheet 1

Inventor

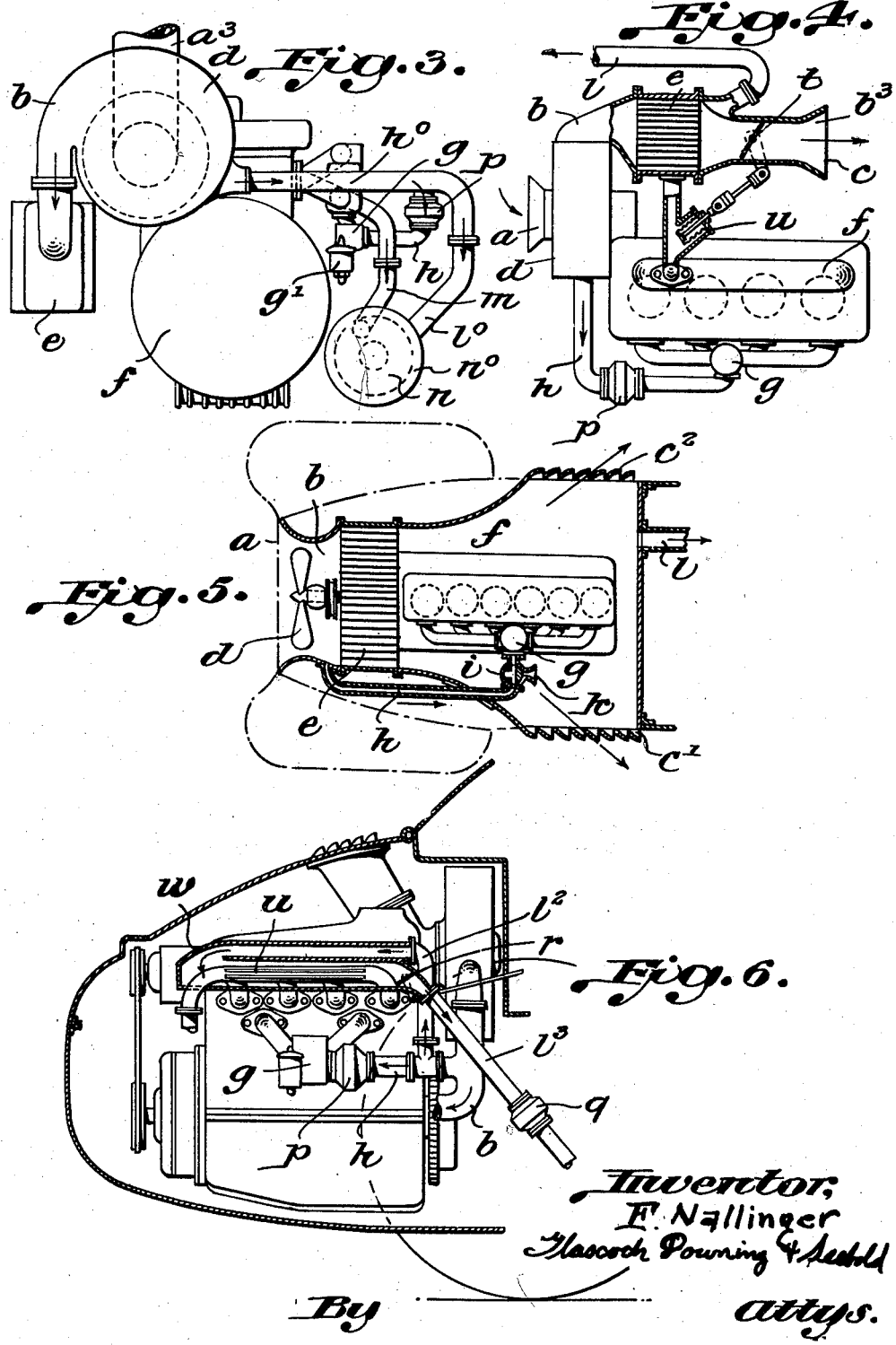

Patented Dec. 7, 1937

2,101,627

UNITED STATES PATENT OFFICE 2,101,627

MOTOR VEHICLE WITH COMPRESSED AIR COOLING

Fritz Nallinger, Stuttgart, Germany, assignor to Daimler-Benz A. G., Stuttgart-Unterturkheim, Germany Application November 16, 1935, Serial No. 50,248
In Germany October 20, 1934

9 Claims. (Cl. 123—119)

This invention relates to motor vehicles in which the air required for cooling the engine is forced through the radiator by means of a high pressure blower disposed in front of the radiator.

The employment of such compressed air cooling has been found to be necessary, more particularly in motor vehicles having the engine mounted at the rear, but it may also be used in motor vehicles in which the engine is mounted in front, for instance where long distances in hilly country have to be travelled over. This involves a certain increase in the manufacturing costs, owing to the necessity of providing a high pressure blower for the compressed air cooling and the consumption of a larger part of the engine output as compared with the cooling methods otherwise employed.

The object of the present invention therefore is to compensate this increase in the expenditure of material and engine power or at least to make it bearable, by utilizing the compressed air produced by the high pressure blower not only for the cooling but for other purposes in the vehicle as well.

The invention consists in the first place in this, that the compressed air delivered by the high pressure blower, in addition to being utilized for cooling the engine, is also used as combustion air for the engine as well.

The invention furthermore consists in this, that compressed air delivered by the high pressure blower, besides being used for cooling the engine, is also used in part as heating air for the fresh air heating of the passenger space.

Figure 1:
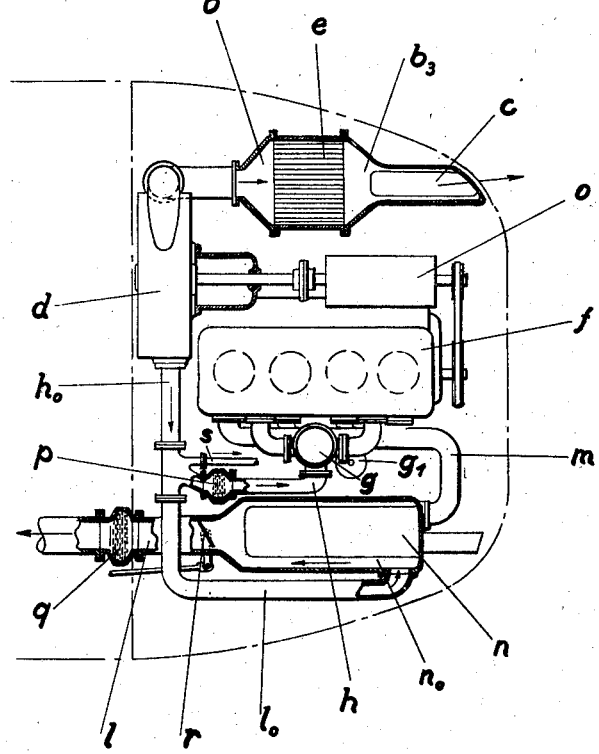
Figure 2:
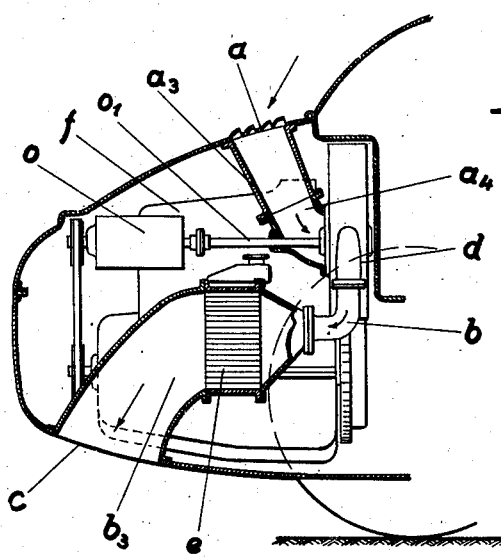

Further features and advantages of the invention will be gathered from the following specification and from the drawings, in which the invention is illustrated by way of example:

Fig. 1 being a plan view of the engine space disposed at the rear end of a motor vehicle, Fig. 2 a side elevation partly in section, Fig. 3 a front elevation of the engine unit, Fig. 4 a plan view of a different rear engine arrangement and Fig. 5 a plan view partly in section of an arrangement of the engine at the front of the vehicle.

In Figs. 1 to 3 of the drawings $a$ is the cooling air inlet at the inlet branch $a_3$, which is provided on the hinged cover of the engine space and through which the cooling air is drawn by suction by way of the passage $a_4$ by a turbo blower $d$. Through the delivery passage $b$ the compressed air is conveyed to the radiator $e$, which in view of the higher velocity of flow of the compressed air, has a relatively great depth with an undiminished cooling action, and thence by way of the outlet passage $b_3$ to the lower outlet opening $c$.

Besides the delivery pipe $b$ for the cooling air, there is also connected to the blower $d$ a further delivery pipe $h_0$, from which three arms $s$, $h$ and $l_0$ branch off. Through one branch pipe, $h$, the carburettor $g$ of the engine receives through an air filter $p$ cool compressed air from the blower, so that the admission to the engine and consequently its power is greatly increased. Consequently the amount of power required for driving the blower for the cooling air is entirely compensated by the increased power of the engine thus obtained, while on the other hand the cooling of the engine, which is improved by the blower, makes this increased output of the engine possible without any disturbances in the operation. As the engine itself does not lie directly in the stream of the cooling air, a cooling jet of air is blown against the float chamber $g_1$ from the branch pipe $s$, in order to prevent any unnecessary heating up of the fuel in the float chamber $g_1$ of the carburettor.

The third branch pipe $l_0$ leads to a heating chamber $n_0$ surrounding the silencer $n$, in which chamber the compressed air coming from the blower is heated by the waste heat of the exhaust gases and is conveyed by way of a regulating member (throttle valve) $r$ through the pipe $l$ into the interior of the car body. This air may pass as fresh air directly through a filter $q$ into the interior of the body or through pipes (also through hollow frame members or parts of the body work) to any parts of the interior of the car (for instance right to the driver's seat), serving the purpose either of heating warming radiators or being used as fresh air heating. By means of the regulating member $r$ in the heating pipe $l$ the heating effect can be regulated either by hand or automatically (for instance in dependence on the temperature of the interior of the car).

The second constructional example shown in Fig. 4 differs from the first example mainly in this, that the heating pipe $l$ branches not directly from the blower $d$, but from the cooling air passage $b_3$, being taken off only behind the radiator $e$, while the compressed air for the carburettor is taken off as in the other case through the pipe $h$ directly at the blower. In order in this case as well to obtain an effective stream of hot air a throttling member $t$ is provided in the outlet pipe $b_3$ for the air which is heated by passing through the radiator, which throttling member is actuated in such a manner by a thermostat interposed in the cooling water pipe between the engine and the radiator, that it will close when the cooling water temperature is too low and open again when the cooling water exceeds the admissible maximum temperature. Through closing the throttle $t$ the air pressure behind the radiator and the cooling water temperature are raised and the effect of the heating stream in the pipe $l$ thereby increased, without the cooling of the engine being too greatly affected, as, when the weather is cold and there is a greater requirement for heating air in the interior of the car, the necessity for cooling the engine becomes less to the same extent.

The constructional example shown in Fig. 5 shows an arrangement for compressed air cooling in the case of a vehicle with the engine mounted in front. The inlet for the cooling air is again marked $a$, the blower $d$, the compressed air radiator $e$ and the cooling air outlet on both sides of the engine bonnet $c_1$ and $c_2$. The engine $f$ is in this case directly in the stream of cooling air forced through the radiator $e$. Between the blower and the radiator there is branched off from the main passage $b$ a branch pipe $h$, through which the combustion air is conveyed to the radiator $g$ under an increased pressure, when the change over member $i$, which is here shown as a three-way cock, is in the position shown. By changing over the member $i$ the combustion air can also be taken from the branch $k$ directly from the engine space. Just as in the previous example air filters may be disposed in front of the carburetor and the outlet of the heated cooling air $c_1$ and $c_2$ may be controlled by hand or by throttling members operated by a thermostat. In this case as well the heating air for the interior of the car is taken from the space between the radiator and the outlets for the cooling air through a pipe $l$.

Figure 6 shows a further constructional example of the heating arrangement as demonstrated by Figure 1. The exhaust $n$ of the engine is surrounded by a casing to which by means of a pipe $l_2$ the pressed air is forwarded from the blower $d$. The pipe $l_3$ by which heated air is forwarded to the interior of the body contains a control member $r$ and an air filtering device $q$. The compressed air pipe $b$ leading to the radiator is shown only in part. By means of a duct $h$ the compressed air is forwarded to the carburettor $g$ thereby passing a filter $p$.

What I claim is:

1. In a power driven vehicle, the combination of a water-cooled internal combustion engine for driving the vehicle and a cooling water circulation system for the engine including a radiator with a pressure blower operatively connected to the engine for supplying cooling air under pressure to the radiator, an air-heating chamber arranged so as to be swept over by exhaust gases from the engine, an air delivery conduit for the pressure blower, a branch conduit in open communication with said air delivery conduit and arranged to deliver cooling air to the radiator, a second branch conduit in open communication with said air delivery conduit and arranged to supply air to the intake of the internal combustion engine and a third branch conduit arranged to deliver air to said heating chamber.

2. In a power driven vehicle, the combination of a water-cooled internal combustion engine for driving the vehicle and a cooling water circulation system for the engine including a radiator with a pressure blower operatively connected to the engine for supplying cooling air under pressure to the radiator, an air-heating chamber arranged so as to be swept over by exhaust gases from the engine, an air delivery conduit for the pressure blower, a branch conduit in open communication with said air delivery conduit and arranged to deliver cooling air to the radiator, a second branch conduit in open communication with said air delivery conduit at a point between the blower and the radiator and arranged to supply air to the intake of the internal combustion engine and a third branch conduit arranged to deliver air to said heating chamber.

3. In a power driven vehicle, the combination of a water-cooled internal combustion engine for driving the vehicle and a cooling water circulation system for the engine including a radiator with a pressure blower operatively connected to the engine for supplying cooling air under pressure to the radiator, an air delivery conduit for the pressure blower having a branch extending on both sides of the radiator for delivering cooling air to the radiator, a second branch conduit in open communication with the air delivery conduit for supplying air to the intake of the engine, a third branch conduit connected to said first-mentioned branch on the side of the radiator remote from the blower for delivering air to said heating chamber and a throttle valve in the first-mentioned branch behind the said third branch conduit so as to enable the stream of air passing through the radiator to be impeded.

4. In a power driven vehicle, the combination as set forth in claim 3 with a thermostat arranged in the cooling water circulating system and actuating means connected to the thermostat and the throttle valve for impeding the air flow through the radiator in accordance with the cooling water temperature.

5. In a power driven vehicle, the combination of a water-cooled internal combustion engine for driving the vehicle and a cooling water circulation system for the engine including a radiator with a pressure blower operatively connected to the engine for supplying cooling air under pressure to the radiator, an air-heating chamber arranged so as to be swept over by exhaust gases from the engine, said radiator and heating chamber being arranged laterally of the engine on opposite sides of the latter, an air delivery conduit for the pressure blower, a branch conduit in open communication with said air delivery conduit and arranged to deliver cooling air to the radiator, a second branch conduit in open communication with said air delivery conduit and arranged to supply air to the intake of the internal combustion engine and a third branch conduit arranged to deliver air to said heating chamber.

6. In a power driven vehicle, the combination of a water-cooled internal combustion engine having a fuel chamber thereon for driving the vehicle and a cooling water circulating system for the engine including a radiator with a pressure blower operatively connected to the engine for supplying cooling air under pressure to the radiator, an air heating chamber arranged so as to be swept over by exhaust gases from the engine, an air delivery conduit for the pressure blower having branch conduits arranged to deliver cooling air to the radiator, to supply air to the intake of the engine and to supply air to the heating chamber and a branch conduit in open communication with said air delivery conduit for supplying cooling air to said fuel chamber.

7. In a power driven vehicle, the combination of a water-cooled internal combustion engine for driving the vehicle, an electric lighting generator operatively connected to the engine for actuation by the latter and a cooling water circulation system for the engine including a radiator with a pressure blower operatively connected to said generator for supplying cooling air under pressure to the radiator, an air-heating chamber arranged so as to be swept over by exhaust gases from the engine, an air delivery conduit for the pressure blower, a branch conduit in open communication with said air delivery conduit and arranged to deliver cooling air to the radiator, a second branch conduit in open communication with said air delivery conduit and arranged to supply air to the intake of the internal combustion engine and a third branch conduit arranged to deliver air to said heating chamber.

8. In a power driven vehicle, the combination of a water-cooled internal combustion engine for driving the vehicle, a vehicle body having a portion thereof enclosing the engine and a cooling water circulating system for the engine including a radiator with a pressure blower operatively connected to the engine for supplying cooling air under pressure to the radiator, an air heating chamber arranged so as to be swept over by exhaust gases from the engine, an air inlet conduit for the blower extending from the wall of that portion of the body which encloses the engine, an air delivery conduit for the pressure blower having an outlet arranged to discharge the air through the bottom of the vehicle, the radiator being interposed in said conduit so as to be cooled by the air flowing through the conduit, and branch conduits in open communication with said air delivery conduit for supplying air to the engine intake and to said air heating chamber.

9. An arrangement for economically utilizing the high pressure blower in motor vehicles having compressed air cooling, characterised by the feature that the compressed air supplied by the high pressure blower, in addition to being used for cooling the engine, is also utilized in part as combustion air for the engine and also in part as heating air for the fresh air heating of the interior of the vehicle.

FRITZ NALLINGER.